United States Patent
Suzuki et al.

(10) Patent No.: US 7,067,446 B2
(45) Date of Patent: Jun. 27, 2006

(54) MATERIAL DEMONSTRATING NEGATIVE OR LOW THERMAL EXPANSION COEFFICIENT AND METHOD FOR MANUFACTURE THEREOF

(75) Inventors: Tomoko Suzuki, Nara (JP); Atsushi Omote, Osaka (JP); Masa-aki Suzuki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/197,304

(22) Filed: Aug. 5, 2005

(65) Prior Publication Data
US 2006/0009345 A1  Jan. 12, 2006

Related U.S. Application Data

(63) Continuation of application No. PCT/JP2004/16677, filed on Nov. 10, 2004.

(30) Foreign Application Priority Data
Nov. 14, 2003  (JP) ............................. 2003-384893

(51) Int. Cl.
*C04B 35/495* (2006.01)
*C04B 35/486* (2006.01)
(52) U.S. Cl. ..................... 501/135; 501/104; 501/105; 501/152; 423/594.12; 423/594.13; 423/594.16
(58) Field of Classification Search ............... 501/104, 501/105, 123, 135, 152; 423/594.12, 594.13, 423/594.16
See application file for complete search history.

(56) References Cited

U.S. PATENT DOCUMENTS

| 5,919,720 | A | 7/1999 | Sleight et al. | |
|---|---|---|---|---|
| 6,812,178 | B1* | 11/2004 | Suzuki et al. | ............... 501/134 |
| 6,844,283 | B1* | 1/2005 | Kuwata et al. | ............ 501/134 |
| 2003/0027703 | A1 | 2/2003 | Suzuki et al. | |
| 2005/0032625 | A1* | 2/2005 | Omote et al. | ............... 501/103 |
| 2006/0009345 | A1* | 1/2006 | Suzuki et al. | ............... 501/104 |

FOREIGN PATENT DOCUMENTS

JP          2003-89572          3/2003

OTHER PUBLICATIONS

Search report PCT/JP2004/016677, Feb. 22, 2005.*

* cited by examiner

*Primary Examiner*—Karl Group
(74) *Attorney, Agent, or Firm*—McDermott Will & Emery LLP (57) ABSTRACT

A material having a negative or low thermal expansion coefficient and composed substantially of a single crystal system is provided.

The material is an oxide represented by the chemical formula $((R^{4+}M^{2+})_{1-x}A^{3+}_{2x})(QO_4)_3$ (where R stands for at least one tetravalent metal element selected from Zr and Hf; M stands for at least one divalent metal element selected from Mg, Ca, Sr, Ba, and Ra; Q stands for at least one hexavalent metal element selected from W and Mo; and A stands for at least one trivalent metal element selected from Al, Sc, Y, Lu, Ga, and In; $0<x<1$) and composed substantially of a single crystal system.

26 Claims, 4 Drawing Sheets

MATERIAL DEMONSTRATING NEGATIVE OR LOW THERMAL EXPANSION COEFFICIENT AND METHOD FOR MANUFACTURE THEREOF

REFERENCE TO RELATED APPLICATION

This Application is a continuation of International Application No. PCT/JP2004/016677, whose international filing date is Nov. 10, 2004, which in turn claims the benefit of Japanese Application No. 2003-384893, filed Nov. 14, 2003, the disclosures of which Applications are incorporated by reference herein. The benefit of the filing and priority dates of the International and Japanese Applications is respectfully requested.

FIELD OF THE INVENTION

The present invention relates to a material demonstrating a negative or low thermal expansion coefficient and a method for manufacture thereof.

BACKGROUND ART

Materials such as oxides, resins, glass, and metals usually demonstrate positive thermal expansion. By contrast, Evans et al. have recently reported various composite oxides demonstrating negative thermal expansion. For example, Evans et al. have conducted a comprehensive analysis of the mechanism of such negative thermal expansion in tungsten oxides such as $ZrW_2O_8$ and $Sc(WO_4)_3$ (U.S. Pat. Nos. 5,322,559, 5,433,778, 5,514,360, 5,919,720, and 6,183,716; J. S. O. Evans et al., Physica B, 241–243, pp. 311–316 (1998); J. S. O Evans et al., J. Solid. State Chem., 137, pp. 148–160 (1998)). In particular, a tungstic acid compound represented by formula $A^{3+}_2(M^{6+}O_4)_3$ was indicated to demonstrate the relationship between the ion radius of the metal element $A^{3+}$ and thermal expansion coefficient and is known to have a negative thermal expansion coefficient that tends to increase with the increase in the ion radius of the metal element (D. A. Woodcock et al., J. Solid State Chem, 149, pp. 92–98 (2000)). Further, composite systems in trivalent metal elements in the tungstic acid compound represented by formula $A^{3+}_2 (M^{6+}O_4)_3$ were comprehensively studied and $Al_{1.7}In_{0.3}(WO_4)_3$ was disclosed to have a linear thermal expansion coefficient of $0.2 \times 10^{-6}$ $K^{-1}$, as measured by thermomechanical analysis (U.S. Pat. No. 5,919,720).

The inventors have studied mixing and firing, for example, of a $HfW_2O_8$ as a material having a negative thermal expansion coefficient and $MgWO_4$ as a material having a positive thermal expansion coefficient and have shown that a very low linear thermal expansion coefficient of $\pm 1.0 \times 10^{-6}$ $K^{-1}$ or less can be obtained and that in this system the thermal expansion coefficient can be controlled (Japanese Unexamined Patent Publication No. 2003-89572). With respect to this material system, a tungsten oxide represented by formula (HfMg) $(WO_4)_3$ was synthesized and found to be composed of a quasibinary system in which changes in thermal expansion are due to mixing of (HfMg) $(WO_4)_3$ with $MgWO_4$ or $HfW_2O_8$. Further, it was confirmed that a tungsten oxide represented by formula (HfMg) $(WO_4)_3$ can be formed by mixing and firing $HfW_2O_8$ and $MgWO_4$ and that this material demonstrates a low thermal expansion coefficient.

Among other oxides, materials of a cordierite system represented by NEXERA (Shin-Nippon Seitetsu K. K.) are known to have a low thermal expansion coefficient (Japanese Unexamined Patent Publication Nos. 2000-290064 and 2001-019540).

Various types of low-expansion glass have been developed for optical lenses and a number of types of glass with low thermal expansion have been introduced (Technological Materials of Sigma Koki K. K. "Optical Polishing Products for Lasers and Thin-film Products". Chapter 1: Glass Materials).

DISCLOSURE OF THE INVENTION

Among tungstic acid composite oxides represented by the formula $A^{3+}_2(M^{6+}O_4)_3$, which were disclosed by Evans et al., a variety of materials with negative and positive thermal expansion have been studied, but all those material were limited to selection of trivalent metal elements. For this reason, in this restricted range, a limitation was placed on the degree of freedom in obtaining the physical properties of materials.

Working examples presented in US Patents issued to Evans et al. disclose a study of materials with low thermal expansion obtained by combining tungsten oxides demonstrating negative thermal expansion and epoxy resins demonstrating positive thermal expansion. However, in a mixed system of such different materials, the manufacturing process is difficult and the temperature range of possible usage is restricted by a decomposition and melting temperature of the resin or glass.

On the other hand, the quasibinary system of $MgWO_4$ or $HfW_2O_8$ that was studied by the inventors is a mixed system of materials having different crystal systems. Therefore, different physical property values (for example, dielectric characteristics and thermal expansion coefficients) and heat-induced transition phenomena are present in combination in the material, and various physical property values are difficult to control in a homogeneous state in the material.

In the research of a material with low thermal expansion represented by the formula (HfMg) $(WO_4)_3$, the attention was focused on the empiric rule relating to ion radius and thermal expansion coefficient and it was found that a single-phase material with negative thermal expansion of a small absolute value can be obtained by synthesis using a combination of metal elements with a small ion radius selected from metal elements with a valence of 2 and 4. However, in the course of the study it was found that materials with positive thermal expansion could not be obtained and that the thermal expansion coefficient is difficult to control effectively.

Accordingly, it is a main object of the present invention to provide a material demonstrating a negative or low thermal expansion and composed substantially of a single phase.

The inventors have conducted a comprehensive study aimed at the resolution of the above-described problems inherent to the conventional technology and have found that the above-describe object can be attained with the oxide having a specific composition. This finding led to the creation of the present invention.

The present invention relates to the below-described material demonstrating a negative or low thermal expansion coefficient and to a method for manufacture thereof.

1. A material having a negative or low thermal expansion coefficient, which is an oxide represented by the chemical formula $((R^{4+}M^{2+})_{1-x}A^{3+}_{2x})(QO_4)_3$ wherein R stands for at least one tetravalent metal element selected from Zr and Hf; M stands for at least one divalent metal element selected from Mg, Ca, Sr, Ba, and Ra; Q stands for at least one hexavalent metal element selected from W and Mo; and A stands for at least one trivalent metal element selected from Al, Sc, Y, Lu, Ga, and In; 0<x<1 and wherein the oxide is composed substantially of one crystal system.

2. The material according to above 1, wherein the crystal system is a rhombic crystal system.

3. The material according to above 1, wherein the thermal expansion coefficient is $-3 \times 10^{-6}$/K or more and $+3 \times 10^{-6}$/K or less.

4. The material according to above 1, wherein the thermal expansion coefficient is $-2 \times 10^{-6}$/K or more and $+2 \times 10^{-6}$/K or less.

5. The material according to above 1, wherein the thermal expansion coefficient is $-3 \times 10^{-6}$/K or more and $+3 \times 10^{-6}$/K or less, and $0 \times 10^{-6}$/K is excluded from the coefficient.

6. The material according to above 1, wherein A includes at least one of Al and In.

7. The material according to above 1, wherein A is (1) Al or (2) a mixed system of Al and at least one of Sc, Y, Lu, and Ga.

8. The material according to above 1, wherein R is Hf.

9. The material according to above 1, wherein R is Zr.

10. The material according to above 1, wherein R is a mixed system of Hf and Zr.

11. The material according to above 1, wherein M is Mg.

12. The material according to above 1, wherein M is a mixed system of Mg and at least one of Ca, Sr, Ba, and Ra.

13. The material according to above 1, wherein M is a mixed system of Ca and Mg.

14. The material according to above 1, wherein Q is W.

15. The material according to above 1, wherein Q is Mo.

16. The material according to above 1, wherein R is Hf and M is Mg.

17. The material according to above 16, wherein Q is W.

18. The material according to above 1, wherein R is a mixed system of Zr and Hf and M is Mg.

19. The material according to above 18, wherein Q is W.

20. The material according to above 1, wherein R is Hf and M is a mixed system of Mg and at least one of Ca, Sr, Ba, and Ra.

21. The material according to above 20, wherein Q is W.

22. The material according to above 20, wherein M is a mixed system of Mg and Ca.

23. The material according to above 22, wherein Q is W.

24. A method for the manufacture of a material having a negative or low thermal expansion coefficient, the method comprising the steps of mixing $(R^{4+}M^{2+})(Q^{6+}O_4)_3$ wherein R stands for at least one tetravalent metal element selected from Zr and Hf; M stands for at least one divalent metal element selected from Mg, Ca, Sr, Ba, and Ra; Q stands for at least one hexavalent metal element selected from W and Mo with $A^{3+}_2(Q^{6+}O_4)_3$ wherein A stands for at least one trivalent metal element selected from Al, Sc, Y, Lu, Ga, and In; Q stands for at least one hexavalent metal element selected from W and Mo, and firing the obtained mixture.

25. The manufacturing method according to above 24, wherein $(R^{4+}M^{2+})(Q^{6+}O_4)_3$ and $A^{3+}_2(Q^{6+}O_4)_3$ are crystalline materials and the crystal systems of the two are identical.

26. The manufacturing method according to above 25, wherein the crystal system is a rhombic crystal system.

The material in accordance with the present invention is an oxide comprising divalent and tetravalent metal elements and also a trivalent metal element and has a single phase (composed substantially of one crystal system). Therefore, the desired negative or low thermal expansion coefficient can be effectively obtained.

The material of the present invention has the following advantages over the mixed system of a resin, glass, and a material with negative thermal expansion and a mixed system of tungsten oxides with positive and negative thermal expansion.

(1) The material can be easily manufactured by the method for the manufacture of usual composite oxides.

(2) Because the material is composed only of oxides, it can be used in a wide temperature range.

(3) Because it is a single-phase material, physical property values inherent to the material can be controlled.

The degree of freedom in controlling the physical property values in the material in accordance with the present invention is higher than that in the conventional $A^{3+}_2(M^{6+}O_4)$ because in addition to selecting divalent and tetravalent metal element, the type and composition ratio of the trivalent metal element can be changed.

Furthermore, a range of thermal expansion coefficient that can be set from negative to positive values by introducing the trivalent metal material in the material in accordance with the present invention is wider than that in the material represented by the formula $(R^{4+}M^{2+})(Q^{6+}O_4)_3$. As a result, for example, a material with a negative thermal expansion coefficient or a low thermal expansion coefficient of not more than $\pm 2 \times 10^{-6}$ K$^{-1}$ (more than 0 K$^{-1}$) can be obtained.

In the method for the manufacture of the material in accordance with the present invention, a composite oxide represented by the formula $(R^{4+}M^{2+})(Q^{6+}O_4)_3$ and a composite oxide represented by the formula $A^{3+}_2(M^{6+}O_4)_3$ are used as source materials. Therefore, the formation of byproducts can be effectively avoided and a more compact sintered body can be obtained with greater reliability. As a result, the desired thermal expansion coefficient can be controlled more accurately.

Furthermore, with the manufacturing method in accordance with the present invention, the thermal expansion coefficient can be also varied by changing the mixing ratio (x) of the above-described composite oxides. Therefore, if the composite oxides of the above-described two types are provided in advance, then the thermal expansion coefficient can be thereafter easily controlled by changing the mixing ratio of the two oxides.

BEST MODE FOR CARRYING OUT THE INVENTION

1. Material Demonstrating Negative or Low Thermal Expansion

The material demonstrating a negative or low thermal expansion coefficient in accordance with the present invention is an oxide represented by the chemical formula $((R^{4+}M^{2+})_{1-x}A^{3+}_{2x})(QO_4)_3$ (where R stands for at least one tetravalent metal element selected from Zr and Hf; M stands for at least one divalent metal element selected from Mg, Ca, Sr, Ba, and Ra; Q stands for at least one hexavalent metal element selected from W and Mo; and A stands for at least one trivalent metal element selected from Al, Sc, Y, Lu, Ga, and In; 0<x<1) and composed substantially of one crystal system.

The specific feature of the material in accordance with the present invention is that, as follows from the formula presented above, in order to improve $((R^{4+}M^{2+})(QO_4)_3)$, part of the $(R^{4+}M^{2+})$ is replaced with a trivalent metal (in particular $Al^{3+}$). More specifically, the specific feature is that a trivalent metal element represented by Al is introduced in addition to a divalent metal element and a tetravalent metal element, and the introduced quantity is 2x with respect to that (x) of the divalent and tetravalent metal elements. As a result, the composition range can be expanded by comparison with the $A^{3+}_2(M^{6+}O_4)$, which is the conventional product, while maintaining a single-phase structure, by changing the type and ratio of the trivalent metal element. Therefore, the degree of freedom in controlling the physical property values can be higher than in the conventional material. A material (material with a low thermal expansion) in which thermal expansion coefficient is accurately controlled can thus be provided. When the introduced quantity of the trivalent metal element is not 2x with respect to part (x) of the divalent and tetravalent metal elements, the material obtained is composed of multiple phases.

Further, "low thermal expansion" in accordance with the present invention means a material with a positive thermal expansion coefficient but of low value or a material in which the thermal expansion coefficient is zero. The "negative thermal expansion" means a material with a negative thermal expansion coefficient. More specifically, it is preferred that the material have the below-described thermal expansion coefficient.

The aforementioned R is at least one tetravalent metal element selected from Zr and Hf. Thus, Zr alone, Hf alone, or a mixed system of Zr and Hf can be employed.

The aforementioned M is at least one divalent metal element selected from Mg, Ca, Sr, Ba, and Ra. Based on the relationship between the ion radius and negative thermal expansion coefficient, which is considered to be an empiric rule, in order to obtain a material having a low thermal expansion, it is preferred that a metal element having a low ion radius be used as the aforementioned M. From this standpoint, it is even more preferred that magnesium be used as the divalent metal element.

The aforementioned Q is at least one hexavalent metal element selected from W and Mo. Thus, W alone, Mo alone, or a mixed system of W and Mo can be employed. Because the sublimation temperature of molybdenum oxide is lower than that of tungsten, when various metal oxides are studied, it is preferred that tungsten ($Q^{6+}$=W), which can be fired at a higher temperature, be selected as the aforementioned Q.

The aforementioned A is at least one trivalent metal element selected from Al, Sc, Y, Lu, Ga, and In.

According to the present invention, for example, among $A_2Q_3O_{12}$ that can be used as the source materials for the manufacturing method in accordance with the present invention, those using Al and In as the A demonstrate a positive linear thermal expansion coefficient. $A_2Q_3O_{12}$ in which other trivalent metal elements are used as the A most often have negative thermal expansion. Among $(RM)(QO_4)_3$, too, almost all the compounds have a negative thermal expansion coefficient. Therefore, when a thermal expansion coefficient of $((RM)_{1-x}A_{2x})(QO_4)_3$ is wished to be decreased by employing mutual cancellation of negative thermal expansion and positive thermal expansion, it is preferred that at least one of Al and In be used as the trivalent metal element. From this standpoint, a mixed system of at least one of Sc, Y, Lu, and Ga and at least one of Al and In can be advantageously used as the A.

When In is used, the thermal expansion coefficient in the vicinity of room temperature sometimes becomes unstable. For this reason, it is even more preferred that aluminum or a mixed system of aluminum and another trivalent metal element be used as the aforementioned trivalent metal element. Thus, (1) Al alone or (2) a mixed system of Al and at least one of Sc, Y, Lu, and Ga can be advantageously used as the A.

The value of x can be appropriately set within a range of 0<x<1 (in particular $0.1 \leq x \leq 0.7$) according to the desired value of thermal expansion coefficient. This value can thus generally be controlled within a range of a low thermal expansion coefficient from −2 ppm/° C. to +2 ppm/° C. For example, when R is a tetravalent metal element represented by Zr, Hf or a mixed system thereof, M is Mg, Q is W, A is Al, and x=0.3, a tungstic acid composite oxide can be obtained which has thermal expansion close to zero, that is, not more than ±0.1 ppm.

The material in accordance with the present invention is substantially composed of one kind of crystal system. In other words, it is composed of one crystal system. This can be easily confirmed by measuring powder X ray diffraction. Further, the crystal body in accordance with the present invention may be either polycrystalline or monocrystalline, but basically it is a polycrystalline body.

No specific limitation is placed on the crystal system type, but a rhombic crystal system is especially preferred. When such a crystal structure is employed, even more superior low thermal expansion characteristic can be demonstrated.

Other crystal systems, a small quantity of amorphous substance, and impurities may be contained, provided that they do not adversely affect the prescribed effect of the present invention.

The mean crystal grain diameter of the crystal body of the present invention can be determined according to the application or utilization object of the material in accordance with the present invention, but usually it can be within a range of about 1 to 10 μm.

The thermal expansion coefficient of the material in accordance with the present invention can be appropriately adjusted by combining the above-described R, M, Q, and A. Generally it is preferred, that the thermal expansion coefficient be $-3 \times 10^{-6}$/K or more but $+3 \times 10^{-6}$/K or less. It is especially preferred that the thermal expansion coefficient be $-2 \times 10^{-6}$/K or more but $+2 \times 10^{-6}$/K or less, and most preferably $-3 \times 10^{-6}$/K or more but $+3 \times 10^{-6}$/K or less (excluding $0 \times 10^{-6}$/K).

The aforementioned thermal expansion coefficient can be easily measured by analyzing a columnar sample with using a thermomechanical analyzer. More specifically, values obtained by conducting measurements by using a thermomechanical analyzer of a differential thermal expansion type "Thermo Plus 2/TMA" (manufactured by Rigaku K. K.) according to JIS R1681 "Methods for Measuring Thermal Expansion of Fine Ceramics by Thermomechanical Analysis" are considered as standard values. During the measurements, fused quartz is used as a reference sample (material with a known linear expansion coefficient) and the measurement atmosphere is air.

Specific compositions of the material in accordance with the present invention are presented below. For example, in the case of x=0.5: $((HfMg)_{0.5}A^{3+})(WO_4)_3$, $((ZrMg)_{0.5}A^{3+})(WO_4)_3$, $((HfCa)_{0.5}A^{3+})(WO_4)_3$, $((ZrCa)_{0.5}A^{3+})(WO_4)_3$, $((HfMg)_{0.5}A^{3+})(MoO_4)_3$, $((ZrMg)_{0.5}A^{3+})(MoO_4)_3$, $((Zr_xHf_{1-x}Mg)_{0.5}A^{3+})(WO_4)_3$ $(0<x<1)$, $((Zr_xHf_{1-x}Ca)_{0.5}A^{3+})(WO_4)_3$ $(0<x<1)$, $((ZrMg_xCa_{1-x})_{0.5}A^{3+})(WO_4)_3$ $(0<x<1)$, $(HfMg_xCa_{1-x})_{0.5}A^{3+})(WO_4)_3$ $(0<x<1)$, $((HfMg)_{0.5}A^{3+})(W_yMo_{1-y}O_4)_2$ $(0<y<1)$, $((ZrMg)_{0.5}A^{3+})(W_yMo_{1-y}O_4)_3$ $(0<y<1)$, and $((HfMg)_{0.5}A^{3+})(W_yMo_{1-y}O_4)_3$ $(0<y<1)$. This list of composite oxides is not limiting and the invention also relates to other composite oxides represented by the above-described formula.

Further, a trivalent metal element represented by $A^{3+}$ is selected from Al, Sc, Y, Ga, In, Lu, Cr, and Er, but mixed systems thereof may be also used. Examples of such mixed systems include $(AlSc)^{3+}$, $(Al_{1.3}Sc_{0.7})^{3+}$, $(Al_{1.5}Sc_{0.5})^{3+}$, $(Al_{1.8}Sc_{0.2})^{3+}$, $(AlY)^{3+}$, $(Al_{0.7}Y_{1.3})^{3+}$, $(Al_{0.9}Y_{1.1})^{3+}$, $(Al_{1.4}Y_{0.6})^{3+}$, $(AlLu)^{3+}$, $(Al_{1.2}Lu_{0.8})^{3+}$, $(Al_{1.4}Lu_{0.6})^{3+}$, $(Al_{1.9}Lu_{0.1})^{3+}$, $(AlIn)^{3+}$, $(Al_{0.5}In_{1.5})^{3+}$, $(Al_{1.5}In_{0.5})^{3+}$, $(Al_{1.8}In_{0.2})^{3+}$, $(ScYb)^{3+}$, $(Sc_{0.3}Yb_{1.7})^{3+}$, $(Sc_{1.4}Yb_{0.6})^{3+}$, and $(Sc_{1.8}Yb_{0.2})^{3+}$; two or more elements may be used for mixing.

The material in accordance with the present invention can be advantageously used for a variety of applications requiring low thermal expansion characteristic, for example, for electronic materials, optical materials, magnetic materials, and structural materials. More specifically, in the case of optical jigs, the material in accordance with the present invention can be used for components for supporting optical materials. Furthermore, in the case of high-frequency dielectrics, it can be used as a dielectric for a high-frequency range, for example, 10 GHz and higher and 300 GHz and lower.

2. Method for the Manufacture of a Material Showing Negative or Low Thermal Expansion The material of the present invention can be manufactured by a liquid-phase method, gas-phase method, or solid-phase method, provided that the above-described composition and crystal body can be obtained. A solid-phase reaction method can be employed as the solid-phase method. A co-precipitation method, and a hydrothermal reaction method can be employed as the liquid-phase method. And a sputtering method and CVD method can be employed as the as-phase method.

More specifically, the material in accordance with the present invention can be advantageously manufactured, for example, by the following solid-phase method. Typical mixed oxides can be prepared by mixing and grinding or kneading metal oxides serving as source materials by using an apparatus such as a ball mill and then calcining, coarsely grinding, molding, and firing. Basically, the material in accordance with the present invention can be also prepared by such typical manufacturing method. In this case, the desired material can be produced without calcination, if sufficiently fine powdering is conducted in the mixing and grinding process.

Compounds (compounds including at least of R, M, A, and Q) that can serve as sources for supplying various elements) can be advantageously used as the source materials.

Examples of such compounds include oxides, hydroxides, carbonates, nitrates, chlorides, acetates, oxalates, metal alkoxides, metal acetylacetonates, metal salts of acetic acid, metal salts of methacrylic acid, and metal salts of acrylic acid. Compounds containing two or more such elements can be also used.

For example, zirconium oxide and hafnium oxide can be used as R compounds.

Examples of M compounds include magnesium oxide, calcium oxide, strontium oxide, magnesium hydroxide, calcium hydroxide, magnesium carbonate, and calcium carbonate.

Examples of A compounds include aluminum oxide, yttrium oxide, scandium oxide, and indium oxide.

For example, tungsten oxide and molybdenum oxide can be used as Q compounds.

For example, $MgWO_4$, $CaWO_4$, $SrWO_4$, which are divalent tungsten oxide, $HfW_2O_8$ and $ZrW_2O_8$, which are tetravalent tungsten oxides, and $A_2Q_3O_{12}$ (for example, $Al_2W_3O_{12}$, $Sc_2W_3O_{12}$), which are trivalent tungsten oxides, may be used as the compounds containing two or more of the above-described elements.

Furthermore, tungstic acid composite oxides (RM)$(QO_4)_3$ (for example, $HfMgW_3O_{12}$, $Zr_xHf_{1-x}Ca(WO_4)_3$) that are of the same crystal system as the $A_2Q_3O_{12}$ may be also used. It is preferred that $A_2Q_3O_{12}$ and (RM)$(QO_4)_3$ be used as the source materials because a more dense fired body can be obtained.

The material in accordance with the present invention typically can be fabricated from an oxide represented by $RO_2$ (R is Zr or Hf), MO (M is Mg, Ca, Sr, Ba, Ra), $A_2O_3$ (A is a trivalent metal element), and $QO_3$ (Q is W or Mo) as the source materials.

Further, a composite oxide represented by formula $(R^{4+}M^{2+})(Q^{6+}O_4)_3$ and a composite oxide represented by formula $A^{3+}_2(M^{6+}O_4)_3$ can be advantageously used as the starting source material. When $((R^{4+}M^{2+})_{1-x}A^{3+}_{2x})(QO_4)_3$ is prepared by using a typical mixing and firing method, source materials of various types (metal oxides of minimum four types) can be used. With this method, too, good compounds can be obtained, but a method using composite oxides of the above-described two types makes it possible to avoid effectively the formation of byproducts, thereby allowing a compact sintered body to be obtained with higher reliability. As a result, the prescribed thermal expansion coefficient can be controlled with better accuracy. With the preferred manufacturing method in accordance with the present invention, $(R^{4+}M^{2+})(Q^{6+}O_4)_3$ and $A^{3+}_2(M^{6+}O_4)_3$ are synthesized in advance and then $((R^{4+}M^{2+})_{1-x}A^{3+}_{2x})(QO_4)_3$ is synthesized by using them as starting source materials. As a result, the solid-phase reactions are limited, the firing process is simplified, and a compact sintered body can be easily obtained. Furthermore, in the materials in accordance with the present invention, thermal expansion coefficient can be also varied by changing the mixing ratio (x). Therefore, if the starting source materials of this manufacturing method are prepared in large quantities, then the prescribed thermal expansion coefficient can be easily designed by varying the mixing ratio of the two starting source materials.

Further, $(R^{4+}M^{2+})(Q^{6+}O_4)_3$, $A^{3+}_2(M^{6+}O_4)_3$ and $((R^{4+}M^{2+})_{1-x}A^{3+}_{2x})(QO_4)_3$ belong to the crystal systems having extremely close symmetry. In other words, the fact that the $(R^{4+}M^{2+})(Q^{6+}O_4)_3$ and $A^{3+}_2(M^{6+}O_4)_3$ serving as starting source materials and the final product are of the same crystal system is extremely advantageous for the manufacture of single-phase $((R^{4+}M^{2+})_{1-x}A^{3+}_{2x})(QO_4)_3$. As a result, there proceeds a solid-phase reaction in which elements are exchanged in the same crystal system, the sintering process is facilitated, and a more compact sintered body can be obtained. Furthermore, the probability of unreacted portions remaining in the final product is extremely low and a material composed of a single crystal system can be effectively obtained.

As described hereinabove, using $(R^{4+}M^{2+})$ $(Q^{6+}O_4)_3$ and $A^{3+}_2(M^{6+}O_4)_3$ of the same crystal system as the final product as the starting source materials makes it possible to obtain a single-phase compact sintered body with higher reliability and to obtain the desired physical property values (in particular, the desired thermal expansion coefficient) in an easy manner and with good reliability.

In accordance with the present invention, in addition to the above-described starting source materials, additives (a binder, a sintering aid, and the like) used for the manufacture of usual sintered bodies can be blended if necessary.

Further, additives can be also used with the object of improving compactness and increasing the reproducibility of material properties. Examples of additives include oxides or compounds of alkaline earth metals (Ca, Mg, and the like), Al, Y, Sc, Lu, Zr, Hf, W, Mo, Fe, Mn, Ni, and Si. More specific examples include oxides such as magnesium oxide, calcium oxide, aluminum oxide, yttrium oxide, scandium oxide, iron oxide, manganese dioxide, silicon dioxide, nickel oxide, zirconium oxide, hafnium oxide, and tungsten oxide; hydroxides such as magnesium hydroxide, calcium hydroxide, and aluminum hydroxide; and carbonates such as magnesium carbonate, calcium carbonate, and barium carbonate. The amount of the additive use is generally within a range of not more than 5 wt. %, preferably 0.1–2 wt. %. If the amount of the additive is too small, the sufficient effect cannot be obtained, and if the amount of the additive exceeds 5 wt. %, the material is melted due to decrease in melting point, or byproducts are produced by a reaction of part of the main source materials or the main source materials themselves. As a result, an undesirable adverse effect is produced on the properties inherent to the main source materials. Furthermore, the aforementioned additives may be used in combinations.

The above-described starting source materials are weighed to obtain the composition of the material in accordance with the present invention and then mixed. No specific limitation is placed on the mixing method, and well-known methods can be used. For example, this operation can be advantageously implemented by using machines capable of mixing and grinding such as grinders, ball mills, planetary mills, and medium mills (for example, attriters and vibration mills). Mixing and grinding may be conducted in a wet or dry mode. The mean particle size of the mixed powder generally may be controlled within a range of about 0.1 to 2 μm.

If necessary, the mixed powder obtained can be calcined. Calcination generally may be carried out in an oxidizing atmosphere or air at a temperature of about 650–1000° C. The calcinating time can be appropriately determined according to the calcinating temperature.

The above-mentioned mixed powder is then molded. No specific limitation is placed on the molding method. For example, molding may be conducted by a casting molding process, doctor blade method, and extrusion molding method. No specific limitation is placed on the molded body density, and it may be set appropriately according to the application of the material in accordance with the present invention.

Further, molding is implemented to adjust the shape of the composite oxide and the same effect is obtained regardless of the shaping method. Thus, not only press shaping by also shaping using a green sheet and conducted by employing various sheet coating apparatuses can be used.

Then, firing of the molded body is conducted. The firing temperature can be set appropriately within a temperature range of 650–1300° C. according to the composition of the material in accordance with the present invention. For example, tungsten composite oxides are preferably fired at a temperature of 900–1200° C., and molybdenum oxide is fired at 700–1000° C. If the firing temperature is too low, the reaction of oxides is incomplete and the desired compound cannot be obtained. If the firing temperature is too high, the compound melts or tungsten oxide or molybdenum oxide present in the compound tend to sublimate. The firing atmosphere generally may be an oxidizing atmosphere or air. The firing time can be set appropriately according to the firing temperature.

EXAMPLES

The present invention will be described below in greater detail based on working examples thereof. The scope of the present invention is, however, not limited to those working examples.

Example 1

$((HfMg)_{0.5}Al)$ $(WO_4)_3$ was prepared, the fired density thereof was calculated, the crystal system was determined by powder X ray diffractometry, and the thermal expansion coefficient was measured by thermomechanical analysis.

The following source materials were used: (1) $HfO_2$ (Kanto Kagaku K. K., purity 99.5%), (2) MgO (Kishida Kagaku K. K.), (3) $Al_2O_3$ (Kanto Kagaku K. K., purity 99.5%), and (4) $WO_3$ (Kojundo Kagaku K. K., purity 4N). The source materials were accurately weighed to obtain a 1:1:2:6 molar ratio, and mixing and grinding were conducted for 144 h with a wet ball mill using pure water as a solvent. Water was removed by overnight drying, then the source material powder was calcined at a temperature of 1000° C., and a calcined powder was obtained. Coarse grinding was then conducted with a grinding machine, followed by press molding. The molded body was subjected to main firing for 4 h at 1100° C.

A sample having a diameter of 20 mm and a height of 20 mm after firing was prepared as a sample for density measurements, and a sample having a diameter of 5 mm and a height of 10 mm after firing was prepared for thermomechanical analysis.

The density after firing was calculated from the sample diameter, height, and weight after firing. The density after firing was 4700 kg/m$^3$. Furthermore, the sample after density measurements was powdered and measurements of powder X ray diffraction were conducted. The thermal expansion coefficient was measured by thermomechanical analysis (Thermo Plus 2 manufactured by Rigaku K. K.).

Figure 1:
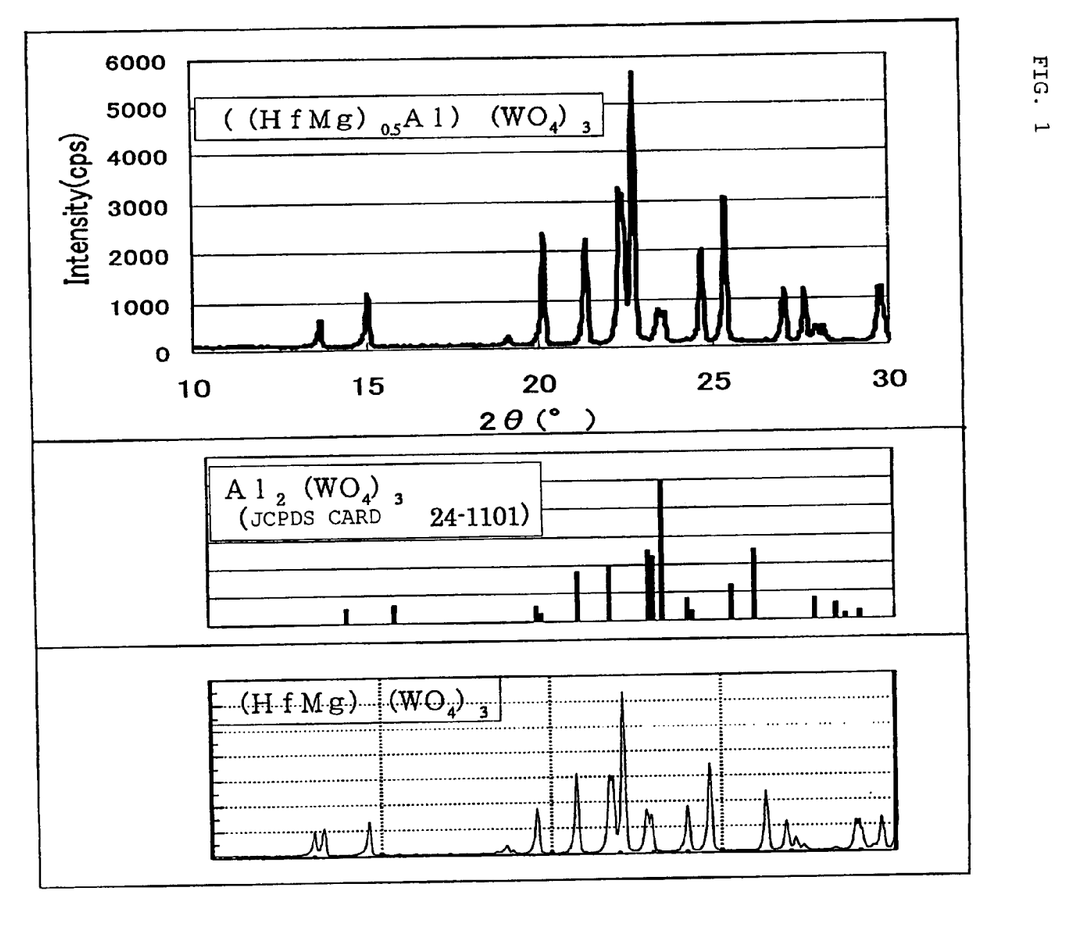
FIG. 1 is a graph illustrating the measurement results of X ray diffraction analysis in $((HfMg)_{0.5}Al)(WO_4)_3$.
Figure 3:
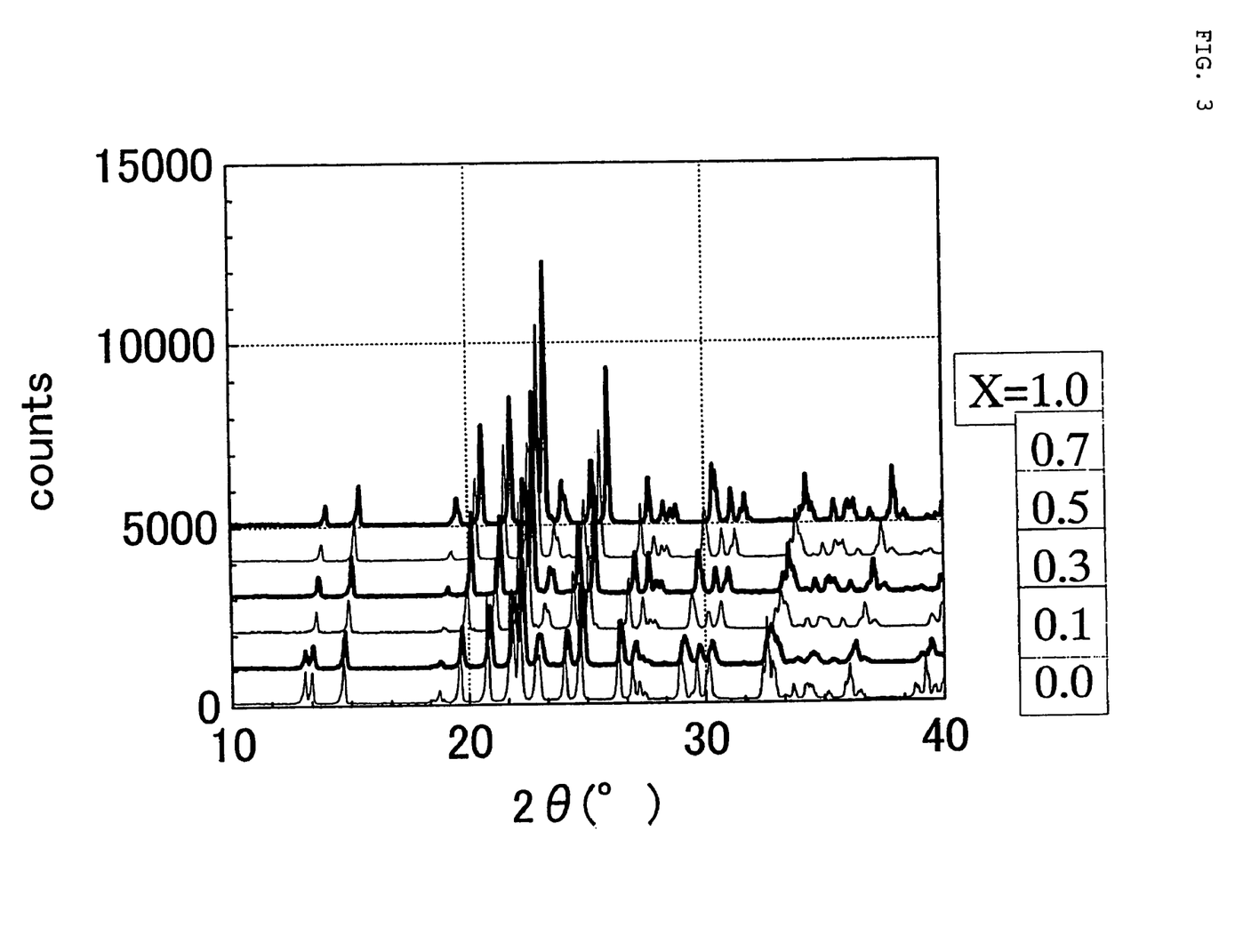
FIG. 3 is a graph illustrating the measurement results of X ray diffraction analysis in $((HfMg)_{1-x}Al_{2x})(WO_4)_3$ (x=0.0, 0.1, 0.3, 0.5, 0.7, 1.0)

The X ray diffraction measurement results are shown in FIG. 1. Those results are also shown in FIG. 3 together with the measurement results of the below-described Working Example 2. The X ray diffraction data form $Al_2(WO_4)_3$ (No. 24-1101) and $(HfMg)$ $(WO_4)_3$ of the JCPDS card are also shown as comparative examples in FIG. 1. The results shown in FIG. 1 and FIG. 3 demonstrate that the products of the working examples have peaks different from the x=0 and x=1 peaks of the known substance. Therefore, it is clear that a novel tungsten oxide different from the $Al_2(WO_4)_3$ and $(HfMg)$ $(WO_4)_3$ was produced.

Furthermore, the X ray diffraction peaks shown in FIG. 1 have the same patterns are the $Al_2(WO_4)_3$ and $(HfMg)$ $(WO_4)_3$. Therefore, the tungstic acid composite oxide produced in the present embodiment clearly has the same rhombic crystal system with a symmetry extremely similar to that of $Al_2(WO_4)_3$ and $(HfMg)(WO_4)_3$.

The above-described results confirmed the generation of the tungstic acid composite oxide represented by the chemical formula $((HfMg)_{0.5}Al)(WO_4)_3$.

Figure 2:
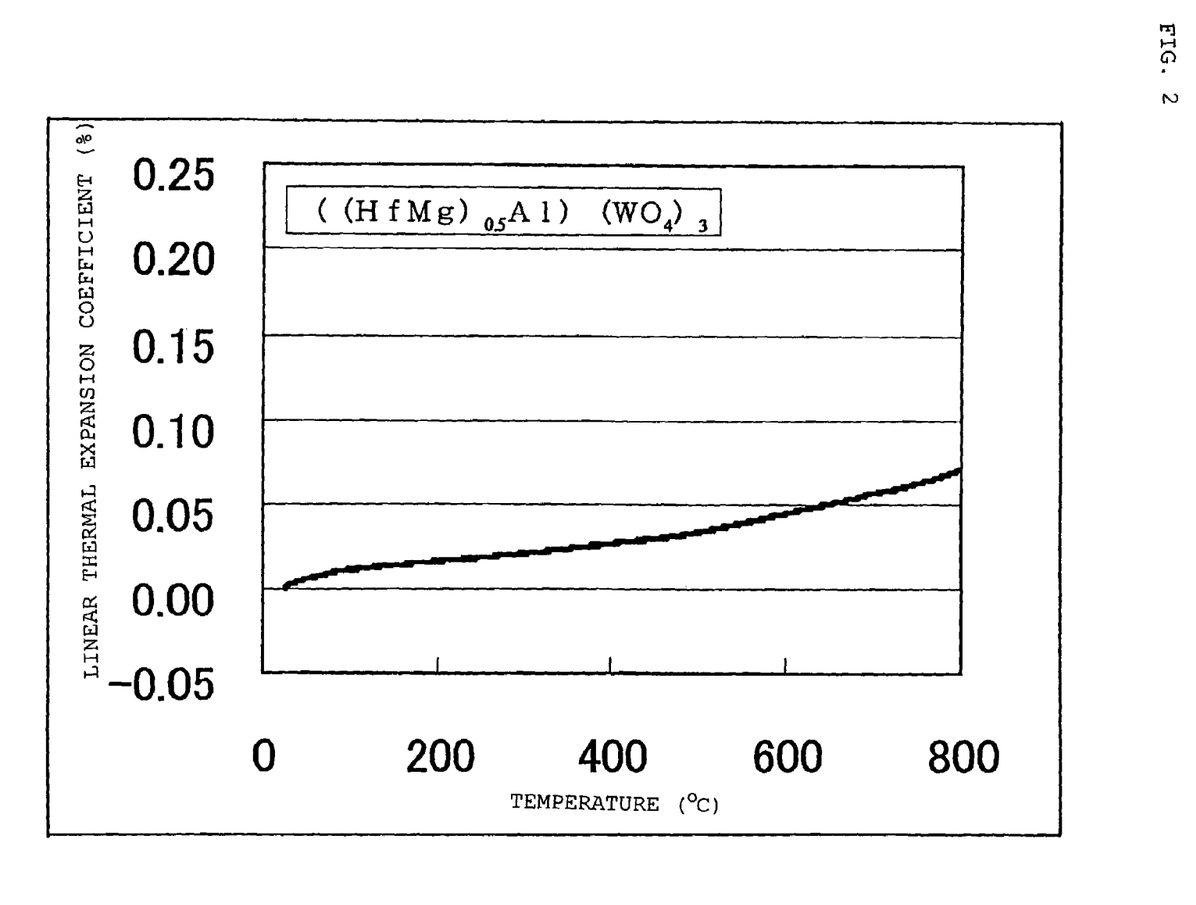
FIG. 2 is a graph illustrating the measurement results of thermal expansion coefficient in $((HfMg)_{0.5}Al)(WO_4)_3$.
Figure 4:
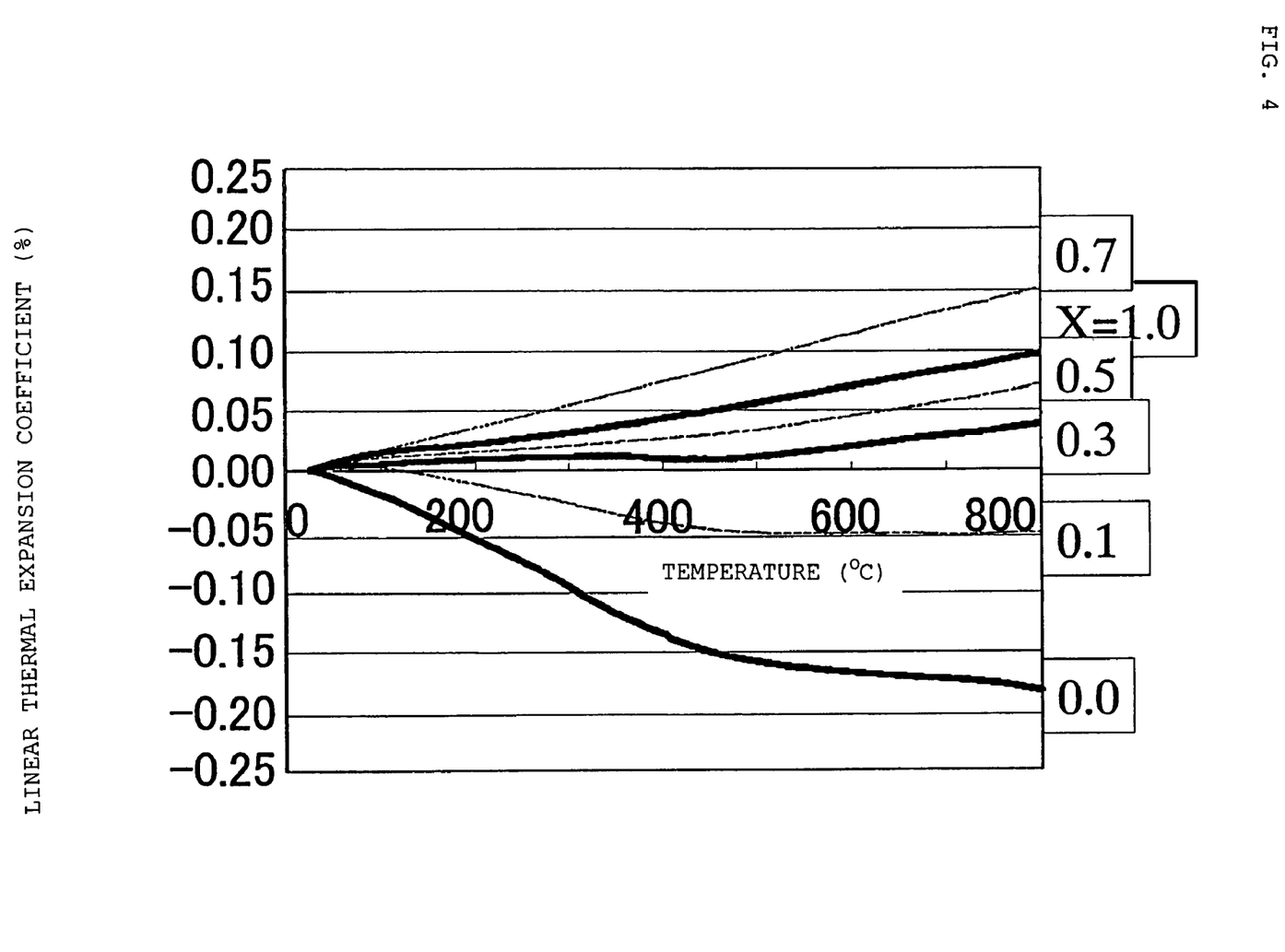
FIG. 4 is a graph illustrating the measurement results of thermal expansion coefficient in $((HfMg)_{1-x}Al_{2x})(WO_4)_3$ (x=0.0, 0.1, 0.3, 0.5, 0.7, 1.0).

The results obtained in measuring the thermal expansion coefficient are shown in FIG. 2. FIG. 4 also shows the measurement results for the thermal expansion coefficient of $Al_2(WO_4)_3$ and $(HfMg)(WO_4)_3$ as comparative examples. FIG. 2 and FIG. 4 show that $((HfMg)_{0.5}Al)(WO_4)_3$ provided in the present embodiment has a thermal expansion coefficient different from those of $Al_2(WO_4)_3$ and $(HfMg)(WO_4)_3$ and is clearly a material with a low thermal expansion coefficient of $+1.0 \times 10^{-6}$ $K^{-1}$.

Example 2

$((HfMg)_{1-x}Al_{2x})(WO_4)_3$ was produced by using $Al_2(WO_4)_3$ and $(HfMg)(WO_4)_3$. The fired density thereof was calculated, the crystal system was determined by powder X ray diffractometry, and the thermal expansion coefficient was measured by thermomechanical analysis.

The $Al_2(WO_4)_3$ was prepared as follows. $Al_2O_3$ (Kanto Kagaku K. K., purity 99.5%), and $WO_3$ (Kojundo Kagaku K. K., purity 4N) were accurately weighed as source materials to obtain a 1:3 molar ratio, wet ball milling and drying were conducted in the same manner as in Example 1. Then, calcining was conducted at a temperature of 1000° C. and coarse grinding was conducted with a grinding machine to produce a calcined powder. The $(HfMg)(WO_4)_3$ was prepared as follows. $HfO_2$ (Kanto Kagaku K. K., purity 99.5%), MgO (Kishida Kagaku K. K.), and $WO_3$ (Kojundo Kagaku K. K., purity 4N) were accurately weighed as source materials to obtain a 1:1:3 molar ratio, wet ball milling and drying were conducted in the same manner as in Example 1. Then, calcining was conducted at a temperature of 1100° C. and coarse grinding was conducted with a grinding machine to produce a calcined powder.

In order to produce samples of $((HfMg)_{1-x}Al_{2x})(WO_4)_3$ of three types with x=0.3, 0.5, and 0.7, the calcined powders of $Al_2(WO_4)_3$ and $(HfMg)(WO_4)_3$ were weighed accurately, mixing was conducted by using respective grinding machine, and mixed powders of three types with x=0.3, 0.5, and 0.7 were obtained.

The mixed powders of the three types were independently press molded and the moldings were subjected to main firing (1100° C.×4 h). The samples were fired for measuring density and conducting thermomechanical analysis in the same manner as in Example 1, and density was measured, powder X ray analysis was conducted, and thermal expansion coefficient was measured after the firing.

Table 1 shows the density after firing.

TABLE 1

| X | CHEMICAL FORMULA | DENSITY AFTER FIRING (g/cm³) | NOTE |
|---|---|---|---|
| 1.0 | $Al_2(WO_4)_3$ | 5.02 | |
| 0.7 | $((HfMg)_{0.3}Al_{1.4})(WO_4)_3$ | 4.96 | |
| 0.5 | $((HfMg)_{0.5}Al)(WO_4)_3$ | 5.08 | Working Example 1 4.7 g/cm³ |
| 0.3 | $((HfMg)_{0.7}Al_{0.6})(WO_4)_3$ | 5.02 | |
| 0.1 | $((HfMg)_{0.9}Al_{0.2})(WO_4)_3$ | 5.06 | |
| 0.0 | $(HfMg)(WO_4)_3$ | 5.11 | |

In the case of x=0.5, $((HfMg)_{0.5}Al)(WO_4)_3$ identical to that of Example 1 is obtained, but the density after firing is clearly higher than that of Example 1. Thus, by comparison with Example 1 in which the product was directly produced from the source materials, producing calcined powders of $Al_2(WO_4)_3$ and $(HfMg)(WO_4)_3$ and then firing the $((HfMg)_{0.5}Al)(Wo_4)_3$ increased the compactness. This result indicates that using source materials with very close crystal systems contributes to a high compactness. As a result, physical values inherent to the material can be obtained with better reliability.

The X ray diffraction measurement results are shown in FIG. 3. FIG. 3 clearly shows that all the materials with x from 0 to 1 demonstrate a rhombic crystal system and because the amount of Al with a small ion radius increases with the increase in x, 2θ shifts to the positive side and the lattice constant of the material shifts to the negative side. Those results demonstrate that $((HfMg)_{1-x}Al_{2x})(WO_4)_3$ was formed in a range of 0<x<1.

The results obtained in measuring thermal expansion coefficient are shown in FIG. 4. From FIG. 4 it follows that thermal expansion coefficient increases with the increase in x in the range of 0<x<0.5. At x=0.7, a thermal expansion coefficient of $1.9 \times 10^{-6}$ $K^{-1}$ was demonstrated. This result makes it clear that a low thermal expansion coefficient of $\pm 2 \times 10^{-6}$ $K^{-1}$ or less is demonstrated in a range of 0<x<1. In particular, it is clear that a thermal expansion coefficient close to zero is demonstrated in the vicinity of x=0.3.

Those results make it clear that tungstic acid composite oxides represented by the chemical formula $((HfMg)_{1-x}Al_{2x})(WO_4)_3$ are produced in a range of 0<x<1, and that those compounds have a low thermal expansion coefficient.

Example 3

$((ZrMg)_{1-x}Al_{2x})(WO_4)_3$ was produced by using $Al_2(WO_4)_3$ and $(ZrMg)(WO_4)_3$, powder X ray diffraction thereof was conducted, and the thermal expansion coefficient was measured by thermomechanical analysis.

$Al_2(WO_4)_3$ produced in Example 2 was used. The calcined powder of $(ZrMg)(WO_4)_3$ was prepared by accurately weighing $ZrO_2$ (manufactured by Daiichi Kigenso Kagaki Kogyo K. K., purity 99.5%), MgO (Kishida Kagaku K. K.), and $WO_3$ (Kojundo Kagaku K. K., purity 4N) as starting source materials to obtain a 1:1:3 molar ratio, conducting wet ball milling and drying in the same manner as in Example 1 and then calcining at a temperature of 1000° C. and coarse grinding with a grinding machine.

The calcined powders of $Al_2(WO_4)_3$ and $(ZrMg)(WO_4)_3$ were weighed accurately and the compositions were adjusted to obtain x=0.3, 0.5, and 0.7 in $((ZrMg)_{1-x}Al_{2x})(WO_4)_3$, and then mixing was conducted by using separate grinding machines, and mixed powders of three types with x=0.3, 0.5, and 0.7 were obtained.

The mixed powders of the three types were independently press molded and the moldings were subjected to main firing, producing samples for powder X ray diffraction and thermomechanical analysis.

In X ray diffraction conducted after firing, the samples of all the three types demonstrated a rhombic crystal structure. This result makes it clear that $((ZrMg)_{1-x}Al_2)(WO_4)_3$ was formed in a range of 0<x<1.

Then, the results obtained in measuring thermal expansion coefficient confirmed that a low thermal expansion coefficient of $\pm 2 \times 10^{-6}$ $K^{-1}$ or less is demonstrated in a range of 0<x<1, similarly to Example 2.

Those results make it clear that the tungstic acid composite oxides represented by the chemical formula $((ZrMg)_{1-x}Al_{2x})(WO_4)_3$ was formed in a range of $0<x<1$ and those compounds had a low thermal expansion coefficient. Further, those compounds demonstrated an extremely low thermal expansion coefficient of $+0.4\times10^{-6}$ $K^{-1}$ in the vicinity of $x=0.3$.

Example 4

$((HfMg)_{1-x}(AlIn)_{2x})(WO_4)_3$ was produced by using $(AlIn)(WO_4)_3$ and $(HfMg)(WO_4)_3$.

$(AlIn)(WO_4)_3$ was produced by accurately weighing $In_2O_3$ (Kanto Kagaku K. K.), $Al_2O_3$ and $WO_3$ to obtain a molar ratio of 1:1:3, conducting wet ball milling and drying in the same manner as in Example 1 and then conducting calcining at a temperature of 1000° C. Powder X ray diffraction confirmed the formation of $(AlIn)(WO_4)_3$ with a rhombic crystal system. The calcined powder produced in Example 2 was used as the $(HfMg)(WO_4)_3$.

The calcined powders of $(AlIn)(WO_4)_3$ and $(HfMg)(WO_4)_3$ were used, weighed to a molar ratio of 1:1 so as to obtain $(HfMg)_{0.5}(AlIn)(WO_4)_3$ and then mixed using a grinding machine.

The mixed powder was press molded and the molded body was subjected to main firing, followed by powder X ray diffractometry. The results demonstrated the peaks of a pattern almost identical to that of $(AlIn)(WO_4)_3$ and $((HfMg)(WO_4)_3$, which were the source materials. Those results demonstrated that $((HfMg)_{0.5}(AlIn))(WO_4)_3$ was produced and that it had a crystal structure of the same rhombic crystal system having symmetry of extremely similar types. The thermal expansion coefficient was positive and was +2 ppm/° C.

This result shows that a tungsten oxide represented by the formula $((R^{4+}M^{2+})_{1-x}A^{3+}{}_{2x})(QO_4)_3$ can be easily and reliably obtained by mixing and firing $A^{3+}{}_2(M^{6+}O_4)_3$ and $(R^{4+}M^{2+})(Q^{6+}O_4)_3$.

Example 5

$((HfMg)_{1-x}(Al_zSc_{1-z})_{2x})(WO_4)_3$ $(0<z<1)$ was produced from $Al_2(WO_4)_3$, $Sc_2(WO_4)_3$, and $(HfMg)(WO_4)_3$.

$Al_2(WO_4)_3$ and $(HfMg)(WO_4)_3$ produced in Working Example 2 were used. $Sc_2(WO_4)_3$ was produced by accurately weighing $Sc_2O_3$ (Kanto Kagaku K. K., purity 99.5%) and $WO_3$ (Kojundo Kagaku K. K., purity 4N) to obtain a molar ratio of 2:3, conducting wet ball milling and drying in the same manner as in Working Example 1 and then conducting calcining at a temperature of 1000° C. Powder X ray diffraction confirmed the formation of $Sc_2(WO_4)_3$ with a rhombic crystal system.

$Sc_2(WO_4)_3$ and $((HfMg)(WO_4)_3$ had the same rhombic crystal system and ion radius of $Sc^{3+}$, $Hf^{4+}$, and $Mg^{2+}$ are close to each other. Therefore, they are materials demonstrating almost identical X ray diffraction results. As for the thermal expansion coefficient, $Sc_2(WO_4)_3$ showed $-2\times10^{-6}$ to $-3.5\times10^{-6}$ $K^{-1}$, and $((HfMg)(WO_4)_3$ showed a value close to $-1\times10^{-6}$ to $-2.5\times10^{-6}$ $K^{-1}$. Further, $Al_2(WO_4)_3$ also had the same rhombic crystal system. The material was synthesized by determining the content of the $Al_2(WO_4)_3$, powder X ray diffractometry of the product was conducted, and thermal expansion coefficient thereof was measured.

The results of Example 2 suggest that when the $Al_2(WO_4)_3$ content is 0.3 mole, thermal expansion coefficient is almost zero. In $((HfMg)_{1-x}(Al_zSc_{1-z})_{2x})(WO_4)_3$, $2xz$ was fixed to 0.6 and $((HfMg)_{1-x}(Al_{0.6}Sc_{2x-0.6}))(WO_4)_3$ was obtained $(0.3<x<1)$.

Calcined powders with $x=0.5$, 0.7, and 0.9 and $x=0.3$ as a comparative example were produced by weighing and mixing in a grinding machine. The mixed powders of those four types were subjected to main firing at a temperature of 1100° C.

Powder X ray diffractometry of the powders was conducted and almost identical X ray diffraction results were obtained for the four types. It was thus found that the tungsten oxides represented by the chemical formula $((HfMg)_{1-x}(Al_{0.6}Sc_{2x-0.6})(WO_4)_3$ had a rhombic crystal system and a lattice constant almost identical to that of $((HfMg)_{0.7}Al_{0.6})(WO_4)_3$.

The thermal expansion coefficient of the materials was then measured and all the four materials demonstrated a low thermal expansion coefficient in a range of $\pm 0.5\times10^{-6}$ $K^{-1}$.

This result shows that various tungsten oxides represented by the formula $((R^{4+}M^{2+})_{1-x}A^{3+}{}_{2x})(QO_4)_3$ can be obtained by selecting a tungsten oxide having a positive thermal expansion coefficient and a tungsten oxide having a negative thermal expansion coefficient of tungsten oxides $A_2(QO_4)_3$ and $(R^{4+}M^{2+})(Q^{6+}O_4)_3$ and that various materials with low thermal expansion can be obtained.

INDUSTRIAL APPLICABILITY

A specific feature of the material with a negative or low thermal expansion coefficient in accordance with the present invention is that the thermal expansion coefficient can be controlled within a range of low thermal expansion coefficients. Therefore, the degree of design freedom can be increased. As a result, it is possible to provide materials suitable for optical components such as optical substrates and optical devices and electronic components such as filters and dielectric substrates. Further, those materials are also suitable for a variety of applications requiring low thermal expansion, for example, in precision mechanisms and semiconductor devices.

The invention claimed is:

1. A material having a negative or low thermal expansion coefficient, which is an oxide represented by the chemical formula $((R^{4+}M^{2+})_{1-x}A^{3+}{}_{2x})(QO_4)_3$ wherein R stands for at least one tetravalent metal element selected from Zr and Hf M stands for at least one divalent metal element selected from Mg, Ca, Sr, Ba, and Ra; Q stands for at least one hexavalent metal element selected from W and Mo; and A stands for at least one trivalent metal element selected from Al, Sc, Y, Lu, Ga, and In; $0<x<1$ and wherein the oxide is composed substantially of one crystal system.

2. The material according to claim 1, wherein the crystal system is a rhombic crystal system.

3. The material according to claim 1, wherein the thermal expansion coefficient is $-3\times10^{-6}$/K or more and $+3\times10^{-6}$/K or less.

4. The material according to claim 1, wherein the thermal expansion coefficient is $-2\times10^{-6}$/K or more and $+2\times10^{-6}$/K or less.

5. The material according to claim 1, wherein the thermal expansion coefficient is $-3\times10^{-6}$/K or more and $+3\times10^{-6}$/K or less, and $0\times10^{-6}$/K is excluded from the coefficient.

6. The material according to claim 1, wherein A includes at least one of Al and In.

7. The material according to claim 1, wherein A is (1) Al or (2) a mixed system of Al and at least one of Sc, Y, Lu, and Ga.

8. The material according to claim 1, wherein R is Hf.

9. The material according to claim 1, wherein R is Zr.

10. The material according to claim 1, wherein R is a mixed system of Hf and Zr.

11. The material according to claim 1, wherein M is Mg.

12. The material according to claim 1, wherein M is a mixed system of Mg and at least one of Ca, Sr, Ba, and Ra.

13. The material according to claim 1, wherein M is a mixed system of Ca and Mg.

14. The material according to claim 1, wherein Q is W.

15. The material according to claim 1, wherein Q is Mo.

16. The material according to claim 1, wherein R is Hf and M is Mg.

17. The material according to claim 16, wherein Q is W.

18. The material according to claim 1, wherein R is a mixed system of Zr and Hf and M is Mg.

19. The material according to claim 18, wherein Q is W.

20. The material according to claim 1, wherein R is Hf and M is a mixed system of Mg and at least one of Ca, Sr, Ba, and Ra.

21. The material according to claim 20, wherein Q is W.

22. The material according to claim 1, wherein M is a mixed system of Mg and Ca.

23. The material according to claim 1, wherein Q is W.

24. A method for the manufacture of a material having a negative or low thermal expansion coefficient, wherein the material is an oxide represented by the chemical formula $((R^{4+}M^{2+})_{1-x}A^{3+}_{2x})(QO_4)_3$ wherein R stands for at least one tetravalent metal element selected from Zr and Hf; M stands for at least one divalent metal element selected from Mg, Ca, Sr, Ba, and Ba; Q stands for at least one hexavalent metal element selected from W and Mo; and A stands for at least one trivalent metal element selected from Al, Sc, Y, Lu, Ga, and In; $0<x<1$ and wherein the oxide is composed substantially of one crystal system, the method comprising the steps of mixing $(R^{4+}M^{2+})(Q^{6+}O_4)_3$ wherein R stands for at least one tetravalent metal element selected from Zr and Hf M stands for at least one divalent metal element selected from Mg, Ca, Sr, Ba, and Ra; Q stands for at least one hexavalent metal element selected from W and Mo with $A^{3+}_2(Q^{6+}O_4)_3$ wherein A stands for at least one trivalent metal element selected from Al, Sc, Y, Lu, Ga, and In; Q stands for at least one hexavalent metal element selected from W and Mo, and firing the obtained mixture.

25. The manufacturing method according to claim 24, wherein $(R^{4+}M^{2+})(Q^{6+}O_4)_3$ and $A^{3+}_2(Q^{6+}O_4)_3$ are crystalline materials having identical crystal systems.

26. The manufacturing method according to claim 25, wherein the crystal system is a rhombic crystal system.

* * * * *

UNITED STATES PATENT AND TRADEMARK OFFICE
CERTIFICATE OF CORRECTION

PATENT NO. : 7,067,446 B2 Page 1 of 1
APPLICATION NO. : 11/197304
DATED : June 27, 2006
INVENTOR(S) : Tomoko Suzuki et al.

It is certified that error appears in the above-identified patent and that said Letters Patent is hereby corrected as shown below:

Column 14, line 45, after "Hf" insert -- ; --
Column 16, line 11, after "Hf" insert -- ; --

Signed and Sealed this

Second Day of January, 2007

JON W. DUDAS
*Director of the United States Patent and Trademark Office*